United States Patent
Epstein

(10) Patent No.: US 9,209,434 B2
(45) Date of Patent: Dec. 8, 2015

(54) MECHANICAL HERMETIC SEAL

(71) Applicant: James Epstein, Sharon, MA (US)

(72) Inventor: James Epstein, Sharon, MA (US)

(73) Assignee: FastCAP Systems Corporation, Boston, MA (US)

( * ) Notice: Subject to any disclaimer, the term of this patent is extended or adjusted under 35 U.S.C. 154(b) by 0 days.

(21) Appl. No.: 13/681,081

(22) Filed: Nov. 19, 2012

(65) Prior Publication Data

US 2013/0143108 A1     Jun. 6, 2013

Related U.S. Application Data

(60) Provisional application No. 61/560,888, filed on Nov. 17, 2011.

(51) Int. Cl.

| | | |
|---|---|---|
| *H01M 2/04* | (2006.01) | |
| *H01G 11/74* | (2013.01) | |
| *H01G 11/80* | (2013.01) | |
| *H01M 2/06* | (2006.01) | |
| *H01G 2/10* | (2006.01) | |
| *H01M 2/08* | (2006.01) | |

(52) U.S. Cl.
CPC .............. *H01M 2/04* (2013.01); *H01G 11/74* (2013.01); *H01G 11/80* (2013.01); *H01M 2/0456* (2013.01); *H01M 2/06* (2013.01); *H01G 2/103* (2013.01); *H01M 2/046* (2013.01); *H01M 2/08* (2013.01); *Y02E 60/13* (2013.01); *Y10T 29/43* (2015.01); *Y10T 29/49108* (2015.01)

(58) Field of Classification Search
CPC .............................. H01M 2/0417; H01M 2/32
See application file for complete search history.

(56) References Cited

U.S. PATENT DOCUMENTS

| | | | |
|---|---|---|---|
| 4,326,016 A | 4/1982 | Selover, Jr. et al. | |
| 6,361,898 B1 * | 3/2002 | Honegger | 429/185 |
| 6,881,516 B2 | 4/2005 | Aamodt et al. | |
| 6,924,059 B1 | 8/2005 | Kawakami et al. | |
| 8,488,301 B2 | 7/2013 | Wetherill et al. | |
| 8,932,750 B2 | 1/2015 | Cooley et al. | |
| 2002/0031705 A1 * | 3/2002 | Tucholski | 429/163 |
| 2003/0003356 A1 | 1/2003 | Tsukamoto et al. | |
| 2003/0027038 A1 | 2/2003 | Tsukamoto et al. | |
| 2003/0030969 A1 | 2/2003 | Farahmandi et al. | |
| 2005/0152096 A1 | 7/2005 | Farahmandi et al. | |
| 2005/0208381 A1 * | 9/2005 | Boulton et al. | 429/234 |
| 2006/0115722 A1 | 6/2006 | Kim | |
| 2006/0292442 A1 | 12/2006 | Sha et al. | |
| 2007/0015336 A1 | 1/2007 | Farahmandi et al. | |
| 2010/0086837 A1 * | 4/2010 | Asari et al. | 429/94 |
| 2010/0215996 A1 * | 8/2010 | Wendling et al. | 429/54 |
| 2010/0216014 A1 * | 8/2010 | Wendling et al. | 429/174 |
| 2011/0085285 A1 | 4/2011 | Zednicek et al. | |
| 2011/0217579 A1 * | 9/2011 | Shimamura et al. | 429/94 |

FOREIGN PATENT DOCUMENTS

WO     WO 2010061521 A1 *   6/2010

* cited by examiner

*Primary Examiner* — Ula C Ruddock
*Assistant Examiner* — Scott J Chmielecki
(74) *Attorney, Agent, or Firm* — Wolf, Greenfield & Sacks, P.C.

(57) ABSTRACT

In one embodiment, a cap for an energy storage cell is provided, the cap including: a body including a dome formed therein, the dome including a through-way; and, an electrode assembly including a hemispherically shaped electrical insulator surrounding an electrode; wherein the insulator is disposed in and hermetically seals the dome and the electrode is electrically separated from the body by the throughway. A method of manufacture and an energy storage cell are also disclosed.

19 Claims, 3 Drawing Sheets

-- PRIOR ART --

MECHANICAL HERMETIC SEAL

CROSS REFERENCE TO RELATED APPLICATION

This patent application is filed under 35 U.S.C. §111(a), and claims priority under 35 U.S.C. §119(e) to U.S. Patent Application No. 61/560,888, filed Nov. 17, 2011, the entire disclosure of which is incorporated by reference herein in its entirety.

BACKGROUND

1. Field

Embodiments are disclosed relating to energy storage cells, and in particular to a cap for an energy storage cell that provides a hermetic seal.

2. Description of the Related Art

Energy storage cells are ubiquitous in our society. While most people recognize an energy storage cell simply as a "battery," other types of cells may be included. For example, recently, ultracapacitors have garnered much attention as a result of their favorable characteristics. In short, many types of energy storage cells are known and in use today.

As a general rule, an energy storage cell includes an energy storage media disposed within a housing (such as a canister). While a metallic canister can provide robust physical protection for the cell, such a canister is typically both electrically and thermally conductive and can react with the energy storage cell. Typically, such reactions increase in rate as ambient temperature increases.

The electrochemical or other properties of many canisters can cause poor initial performance and lead to premature degradation of the energy storage cell, especially at elevated temperatures.

Aluminum is attractive to designers of such housings, however, use of aluminum is fraught with complications. For example, no one has been able to provide a hermetic seal with an aluminum housing (i.e., a seal with a leak rate of less than 5 E-6 std cc He/sec). Known techniques for providing an hermetic seal involve use of glass-to-metal sealing techniques, which typically involve fusing glass to stainless steel. Generally, the temperature required to achieve this type of seal is in excess of 1,000 degrees Celsius, which is well beyond the melting point of aluminum (660 degrees Celsius).

What are needed are methods and apparatus for providing an aluminum housing for an energy storage cell. Preferably, the methods and apparatus result in improved performance at a minimal cost.

SUMMARY

In one embodiment, a cap for an energy storage cell includes a body having a hole therethrough and an electrode assembly having a mechanical hermetic seal within the body.

In another embodiment, a method for fabricating a cap for an energy storage cell includes: selecting a body for the cap; and affixing an electrode surrounded by a hemispherically shaped electrical insulator into the body.

In yet another embodiment, an energy storage cell includes a body comprising an energy storage media disposed therein and a cap comprising a dome having a through-way. An electrode assembly comprising a hemispherically shaped electrical insulator surrounding an electrode is disposed in and hermetically seals the dome while providing electrical access to the energy storage media.

In another embodiment, an energy storage cell includes a cap comprising a dome with a first shape and an insulator with a second shape substantially conforming to the first shape. The insulator is at least partially disposed within the dome and is made from a compressible material. The insulator includes a hole passing through the insulator. An electrode is disposed in the hole, and the insulator is compressed to form a hermetic seal between the insulator and dome and between the insulator and electrode.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Disclosed herein is a housing for an energy storage cell. A combination of the energy storage cell and the housing provides users a power supply having improved electrical performance. The housing is simple to construct, economic to fabricate, and provides a robust hermetic seal.

In various embodiments, the housing and all internal facing parts of the housing are formed of aluminum or an alloy thereof. Accordingly, improved performance may be realized through reduced internal corrosion, elimination of problems associated with use of dissimilar metals in a conductive media and for other reasons as will be apparent to one skilled in the art.

The energy storage may include any type of technology practicable. In various embodiments, the energy storage is a capacitor, in particular, an ultracapacitor (which is described below with reference to FIG. 3). Other forms of energy storage may be used, including electrochemical batteries, in particular, lithium based batteries.

In one embodiment, a cap for an energy storage cell is provided, the cap including: a body including a dome formed therein, the dome including a through-way; and, an electrode assembly including a hemispherically shaped electrical insulator surrounding an electrode; wherein the insulator is disposed in and hermetically seals the dome and the electrode is electrically separated from the body by the throughway.

In another embodiment, a method for fabricating a cap for an energy storage cell, is provided, the method including: selecting a body for the cap; affixing an electrode surrounded by a hemispherically shaped electrical insulator into the body.

In a third embodiment, an energy storage cell is provided and includes: a body including an energy storage media disposed therein; and a cap including a dome having a throughway and an electrode assembly including a hemispherically shaped electrical insulator surrounding an electrode, the assembly disposed in and hermetically sealing the dome while providing electrical access to the energy storage.

In a fourth embodiment, an electrode assembly may include a spherical insulator/seal.

In a fifth embodiment, an electrode assembly may include a cylindrical seal with a through-bolt or other appropriate compression device (called a "boat plug"). It should be appreciated that the foregoing concepts, and additional concepts discussed below, may be arranged in any suitable combination, as the present disclosure is not limited in this respect.

Figure 1:
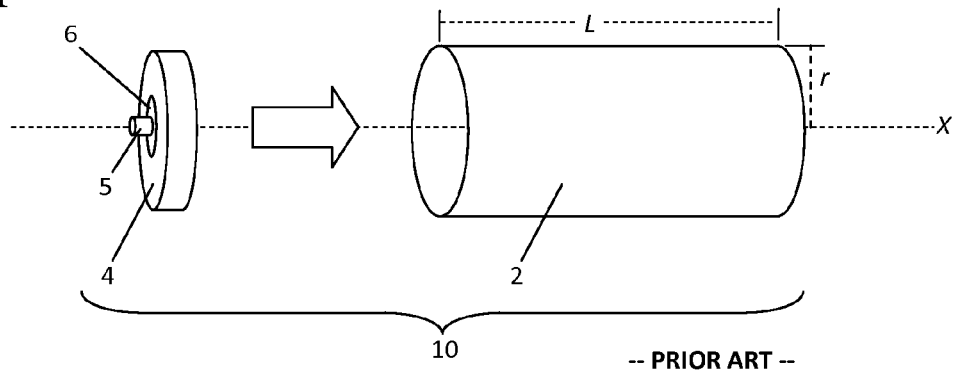
FIG. 1 illustrates a prior art housing for an energy storage cell.

Refer now to FIG. 1, where aspects of a prior art housing 10 are shown. The housing 10 (also referred to as a "canister" and by other similar terms) provides structure and physical protection for the capacitor. In this example, the housing 10 includes an annular cylindrically shaped body 2 and a prior art cap 4. In this embodiment, the prior art cap 4 includes a central portion that has been removed and filled with an electrical insulator 6. A cap electrode 5 penetrates through the electrical insulator 6 to provide users with access to the stored energy.

In this example, the annular cylindrically shaped body 2 is symmetric about an axis, X, and has a radius, r, as well as a length, L.

Figure 2:
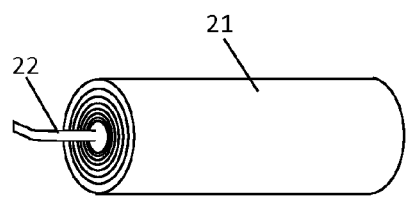
FIG. 2 illustrates aspects of energy storage media in the form of an ultracapacitor suited for disposition within the housing of FIG. 1.
Figure 3:
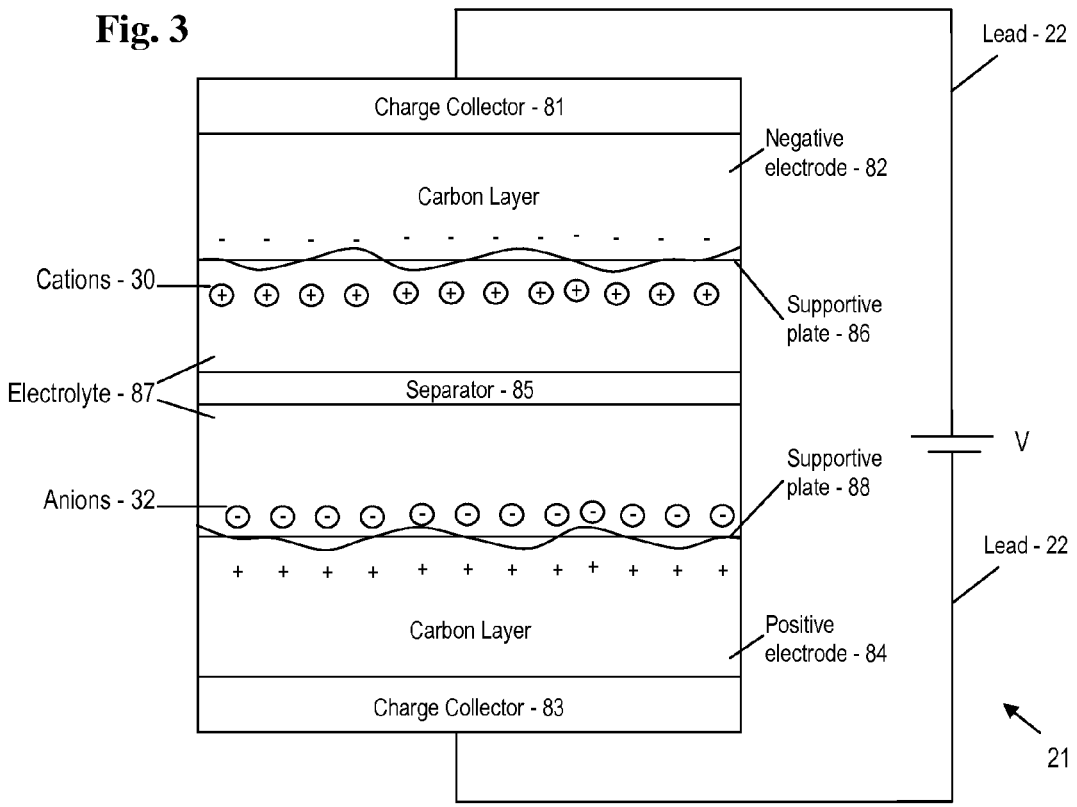
FIG. 3 depicts aspects of an ultracapacitor which may serve as the energy storage media of FIG. 2.

Referring now to FIG. 2, there is shown an exemplary energy storage media 21. In this example, the energy storage media 21 is a "jelly roll" type of construction. In these embodiments, sheets of materials providing for the energy storage are rolled up into a tight package. At least one inner electrode (also referred to as a "lead") 22 provides electrical access to the appropriate layer of the energy storage media 21. Generally, when assembled, the lead 22 is electrically coupled to the electrode 5 on the housing 10. The energy storage media 21 may assume a variety of forms. There are generally at least two leads, one for each charge collector (as shown in FIG. 3). For simplicity, only one of the leads 22 is shown in various places herein, however, this should not be construed that merely one lead is included in the design.

Referring now to FIG. 3, aspects of an exemplary energy storage media 21 are shown. In this embodiment, the energy storage media 21 is an electrochemical double-layer capacitor (EDLC). However, it should be recognized that this embodiment and the discussion herein is merely illustrative of aspects of ultracapacitor technology, and is not limiting of the teachings herein, nor of the forms of ultracapacitors where the teachings herein may be practiced.

In this example, the exemplary energy storage media 21 is an electrochemical double-layer capacitor (EDLC). In this embodiment, the EDLC includes two electrodes 82, 84, each with a double layer of charge at an electrolyte interface, supported on conductive metal plates 86, 88.

The exemplary EDLC 80 includes charge collectors 81, 83, respectively, an electrolyte 87 and a separator 85. In general, the electrolyte 87 is a substance that provides electrically charged ions. An electrolytic solution conducts electricity by ionic transport.

In general, the separator 85 is a thin structural material (usually a sheet) used to separate the electrodes 82, 84, of a divided electrochemical cell into two or more compartments. The electrolyte 87 may occupy pores in the electrodes 82, 84 and separator 85.

Exemplary electrodes 82, 84 may be provided by and include a carbon bearing material, such as activated carbon, carbon fibers, rayon, graphene, aerogel, carbon cloth, and/or multi-wall (MW) or single-wall (SW) carbon nanotubes (CNTs) as well as other materials. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body.

Carbon fiber electrodes can be produced, for example, by using a paper or cloth preform with high surface area carbon fibers.

In one specific example, multiwall carbon nanotubes (MWNT) on a variety of substrates using chemical vapor deposition (CVD) are fabricated for use in the electrodes 82, 84 of EDLC 80. In one embodiment, low-pressure chemical vapor deposition (LPCVD) is used. The fabrication process may use a gas mixture of acetylene, argon, and hydrogen, and an iron catalyst deposited on the substrate using electron beam deposition and/or sputtering deposition.

The electrolyte 87 may include a pairing of a cation and an anion and may include a solvent. Various combinations of each may be used. In the exemplary EDLC 80, the cation may include a cation based on at least one of ammonium, imidazolium, oxazolium, phosphonium, piperidinium, pyrazinium, pyrazolium, pyridazinium, pyridinium, pyrimidinium, pyrrolidinium, sulfonium, thiazolium, triazolium, an asymmetric organic cation, as well as appropriate combinations thereof. In short, the cation may include a variety of compounds that provide for ionic transport and perform well under conditions determined as requirements by a manufacturer, designer or user.

Specific examples of the cation include 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, and 3-Methyl-1-propylpyridinium, and combinations thereof.

In the exemplary EDLC 80, the anion may include any negatively charged ion with a delocalized negative charge, and which is resistant to hydrolysis under a range of environmental conditions as may be determined as requirements by a manufacturer, designer or user. Specific examples include bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl) borate, and combinations thereof as well as other equivalents as deemed appropriate.

The solvent can be acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, butylene carbonate, lactone, linear ether, methyl formate, methyl propionate, methyltetrahydrofuran, butyronitrile, propionitrile, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, tricyanohexane, any combination thereof or other material(s) that exhibit appropriate performance characteristics.

The separator 85 can be fabricated from non-woven glass. The separator 85 can also be fabricated from fiberglass, flouro-polymers, TEFLON® (available from DuPont Chemical of Wilmington Del.), PTFE, and ceramics as well as other materials. For example, using non-woven glass, the separator 85 can include main fibers and binder fibers each having a fiber diameter smaller than that of each of the main fibers and allowing the main fibers to be bonded together.

Figure 4A:
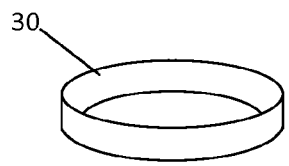
FIGS. 4A, 4B and 4C, collectively referred to herein as FIG. 4, depict aspects of a template for an improved cap for the energy storage cell of FIG. 1.
Figure 4B:
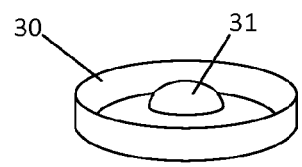
Figure 4C:
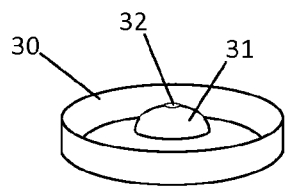

Refer now to FIG. 4 in which aspects of a novel cap are depicted. FIG. 4A depicts a template that is used to provide a cap body 30. The cap body 30 is generally sized to mate with the housing 2 of an energy storage cell. The cap may be formed by initially providing a blank, and forming the cap body 30, then including a dome 31 (shown in FIG. 4B) and by then perforating the dome 31 to provide a through-way 32 (shown in FIG. 4C). Of course, a blank (e.g., a circular piece of stock) may be pressed such that the foregoing features are simultaneously provided. While a specific manufacturing process has been described above, it should be understood that any applicable manufacturing process could be used to form the currently disclosed components.

In general, the cap body 30 is formed of aluminum, or an alloy thereof. However, the cap body 30 may be formed of any material that is deemed suitable by a manufacturer, user, designer and the like. For example, the body 30 may be fabricated from steel and passivated (i.e., coated with an inert coating) or otherwise prepared for use in the housing 10.

Figure 5:
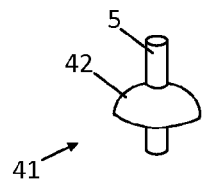
FIG. 5 is a perspective view of an electrode assembly that includes hemispherically shaped material.

Referring now also to FIG. 5, there is shown an electrode assembly 41. The electrode assembly 41 includes the electrode 5 and a hemispherically shaped material disposed about the electrode 5. The hemispheric insulator 42 may be fabricated of any suitable material for providing a hermetic seal while withstanding the chemical influence of the electrolyte 87. Exemplary materials include PFA (perfluoroalkoxy polymer), FEP (fluorinated ethylene-propylene), PVF (polyvinylfluoride), TFE (tetrafluoroethylene), CTFE (chlorotrifluoroethylene), PCTFE (polychlorotrifluoroethylene), ETFE (polyethylenetetrafluoroethylene), ECTFE (polyethylenechlorotrifluoroethylene), PTFE (polytetrafluoroethylene), another fluoropolymer based material as well as any other material that may exhibit similar properties (in varying degrees) and provide for satisfactory performance (such as by exhibiting, among other things, a high resistance to solvents, acids, and bases at high temperatures, low cost and the like).

The electrode 5 may be formed of aluminum, or an alloy thereof. However, the electrode 5 may be formed of any material that is deemed suitable by a manufacturer, user, designer and the like. For example, the electrode 5 may be fabricated from steel and passivated (i.e., coated with an inert coating, such as silicon) or otherwise prepared for use in the electrode assembly 41. An example of a technique for passivation is provided in U.S. Pat. No. 6,444,326, entitled "Surface Modification of Solid Supports Through the Thermal Decomposition and Functionalization of Silanes" which is incorporated herein by reference in its entirety. In addition to the above, it should be understood the electrode may be made from any appropriate material that is compatible with the materials within the capacitor and/or electrochemical cell.

The hemispheric insulator 42 may be sized relative to the dome 31 and the cap body 30 such that a snug fit (i.e., hermetic seal) is achieved when assembled into a cap. The hemispheric insulator 42 need not be perfectly symmetric or of classic hemispheric proportions and may be spheric. That is, the hemispheric insulator 42 is substantially hemispheric, and may include, for example, slight in proportions, a modest flange (such as at the base) and other features as deemed appropriate. The hemispheric insulator 42 is generally formed of homogeneous material, however, this is not a requirement. For example, the hemispheric insulator 42 may include an air or gas filled torus (not shown) therein to provide for desired expansion or compressability. In the depicted embodiment, the hermetic seal is provided by the compression of insulator 42 against electrode 5 and the complementarily shaped dome 31. In addition, while hemispherical and sphere shapes have been described above, other shapes substantially conforming to a differently shaped dome are also possible. For example, in one embodiment a shape exhibiting a symmetric surface such as a cone might be used.

Figure 6:
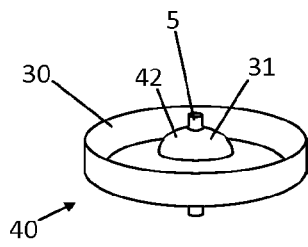
FIG. 6 is a perspective view of a cap including the electrode assembly of FIG. 5 installed in the template of FIG. 4.

As shown in FIG. 6, the electrode assembly 41 may be inserted into the cap body 30 to provide for a cap with a hemispheric hermetic seal. For simplicity, the cap with a hemispheric hermetic seal is simply referred to herein as the "cap 40," while the cap of the prior art is referred to as the "prior art cap 4."

Figure 7:
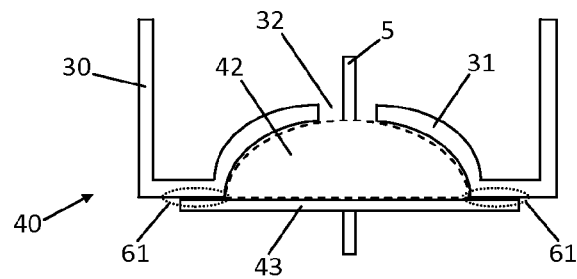
FIG. 7 is a cross-sectional view of the cap of FIG. 6.

As shown in FIG. 7, in various embodiments, a retainer 43 is bonded to a bottom of the cap 40 (i.e., a portion of the cap 40 that faces to an interior of the energy storage cell). The retainer 43 may be bonded to the cap 40 through various techniques, such as aluminum welding (such as laser, ultrasonic and the like). Other techniques may be used for the bonding, including for example, stamping (i.e., mechanical bonding) and brazing. The bonding may occur, for example, along a perimeter of the retainer. Generally, the bonding is provided for in at least one bonding point 61.

Figure 9A:
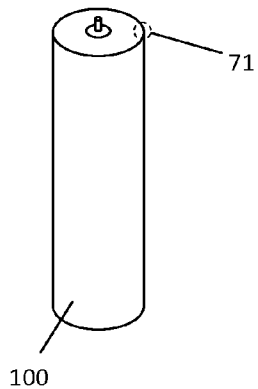
FIGS. 9A, 9B and 9C, collectively referred to herein as FIG. 9, depict embodiments of an assembled energy storage cell.
Figure 9B:
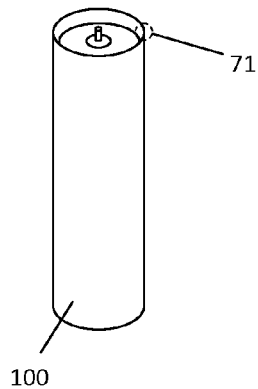
Figure 9C:
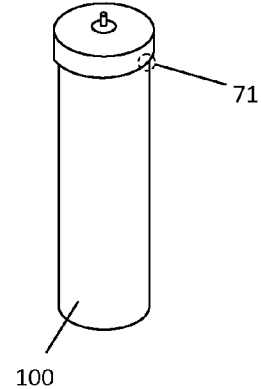

In the example of FIG. 7, the cap 40 is of a concave design (see FIG. 9B). However, other designs may be used. For example, a convex cap 40 may be provided (FIG. 9A), and an over-cap 40 may also be used (FIG. 9C).

Figure 8:
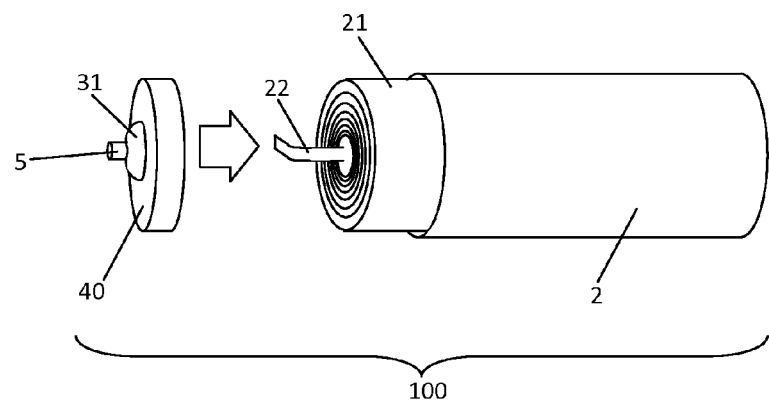
FIG. 8 is a perspective view depicting assembly of an energy storage cell according to the teachings herein.
Figure 10:
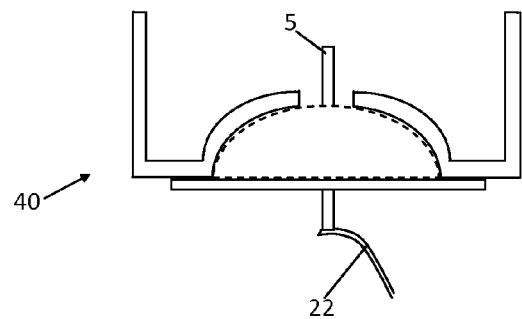
FIG. 10 depicts coupling of the electrode assembly with a lead of the ultracapacitor.

Referring now to FIG. 8, an exemplary energy storage cell (ESS) 100 is shown. The energy storage cell (ESS) 100 includes the cap 40 which is mated to a conventional housing 2. The housing 2 includes the ultracapacitor 21 disposed therein. Each of the leads 22 of the ultracapacitor 21 are mated to an electrode 5. In some embodiments, selected ones of the leads are mated to the housing 2 which also functions as an electrode 5. As depicted in FIGS. 9A-9C, the cap is attached to the housing 2 via weld 71. Exemplary mating of one of the leads 22 is shown in FIG. 10. Specifically, in FIG. 10, one of the leads 22 is coupled, such as via welding, to the electrode of the cap 40.

Having thus introduced the cap 40, and uses of the cap 40, additional aspects are now presented for consideration.

In some embodiments, at least one of the housing 2 and the cap 40 include materials that include a plurality of layers. For example, a first layer of material may include aluminum, with a second layer of material being stainless steel. In this example, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate. Advantageously, this provides for welding of stainless steel to stainless steel, a relatively simple welding procedure.

The material used for the cap body 30 as well as the electrode 5 may be selected with regard for thermal expansion of the hemispheric insulator 42. Further, manufacturing techniques may also be devised to account for thermal expansion. For example, when assembling the cap 40, a manufacturer may apply pressure to the hemispheric insulator 42, thus at least somewhat compressing the hemispheric insulator 42. In this manner, there at least some thermal expansion of the cap body 30 is provided for without jeopardizing efficacy of the hermetic seal.

While material used for construction of the body 2 includes aluminum, any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 2. Additional materials (such as structural materials or electrically insulative materials, such as some polymer-based materials) may be used to compliment the body and/or the housing 2. The materials disposed over the aluminum may likewise be chosen by what is deemed appropriate by a designer or fabricator.

Use of aluminum is not necessary or required. In short, material selection may provide for use of any material deemed appropriate by a designer, fabricator, or user and the like. Considerations may be given to various factors, such as, for example, reduction of electrochemical interaction with the electrolyte 87, structural properties, cost and the like.

As used herein, the term "hermetic seal" refers to a seal that exhibits a leak rate no greater than 5 E-6 std cc He/sec. In some instances, the term "hermetic seal" covers the range of a leak rate between approximately 10 E-10 std cc He/sec to 5 E-6 std cc He/sec. However, it is considered that the actual seal efficacy may perform above (or below) this standard. It is also considered that performance of a successful seal is to be judged by the designer, manufacturer or user as appropriate.

Although this example depicts only one electrode 5 on the cap 40, it should be recognized that the construction of the cap 40 is not limited by the embodiments discussed herein. For example, the cap 40 may include a plurality of electrodes 5. In some embodiments, the housing 10 includes a second, similar cap 40 at the opposing end of the annular cylinder. In some embodiments, multiple electrodes with separate insulators and hermetic seals may be incorporated into the same cap. Further, it should be recognized that the housing 10 is not limited to embodiments having an annular cylindrically shaped body 2. For example, the housing 10 may be a clamshell design, a prismatic design, or of any other design that is appropriate for the needs of the designer, manufacturer or user. Accordingly, the cap 40 may be generally planar or of another form factor deemed suitable. Further, the mechanical hermetic seal may be the hemispherical seal as noted above, a spherical seal, or a cylindrical seal as noted below.

One skilled in the art will recognize that the various components or technologies may provide certain necessary or beneficial functionality or features. Accordingly, these functions and features as may be needed in support of the disclosed embodiments and variations thereof, are recognized as being inherently included as a part of the teachings herein and a part of the current disclosure and claimed herein.

As a matter of convention, the term "may" is to be construed as optional, the term "includes" is to be construed in an open ended fashion, that is, "includes" does not exclude other elements not listed herein; "should" is likewise a term that expresses an optional condition; "a" and "an" are generally used to introduce elements, while "the" or "said" generally refers back to previously introduced elements, but in reference backwards, may also account for additional or other aspects not previously introduced.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A cap for an energy storage cell, the cap comprising:
a metallic body comprising a dome with a first shape, the metallic body having a hole therethrough;
a non-metallic insulator with a second shape having at least a portion disposed within the dome, said portion substantially conforming to the first shape to form an interference fit between the portion and an inner surface of the dome,
wherein the insulator is made from a compressible material and includes a through way passing through the insulator; and
an electrode extending through the through way and the hole,
wherein the insulator is compressed to form a hermetic seal between the insulator and dome and a hermetic seal between the insulator and electrode.

2. A cap as defined in claim 1, wherein the insulator comprises a substantially hemispherical element or a substantially spherical element.

3. A cap for an energy storage cell as defined in claim 2, wherein the electrode is electrically separated from the body.

4. The cap as in claim 3, further comprising a retainer coupled to the body, the retainer adapted for retaining the insulator against the dome and ensuring the hermetic seal between the insulator and the dome.

5. The cap as in claim 4, wherein the retainer is bonded to the body by at least one of welding, stamping and brazing.

6. The cap as in claim 1, wherein the insulator comprises at least one of perfluoroalkoxy polymer, fluorinated ethylene-propylene, polyvinylfluoride, tetrafluoroethylene, chlorotrifluoroethylene, polychlorotrifluoroethylene, polyethylenetetrafluoroethylene, polyethylenechlorotrifluoroethylene, polytetrafluoroethylene and another fluoropolymer based material.

7. The cap as in claim 1, wherein at least one of the body and the electrode comprise one of aluminum, an alloy of aluminum, aluminum clad onto a least one other material and a passivated material.

8. The cap as in claim 1, wherein at least one of the body and the electrode comprise a material that has been treated to reduce electrochemical interaction with an electrolyte.

9. An energy storage cell comprising:
a housing body comprising an energy storage media disposed therein; and
at least a first cap comprising:
a metallic body comprising a dome with a first shape, the metallic body having a hole therethrough;

a non-metallic insulator with a second shape having at least a portion disposed within the dome, said portion substantially conforming to the first shape to form an interference fit between the portion and an inner surface of the dome, wherein the insulator is made from a compressible material and includes a through way passing through the insulator; and an electrode extending through the through way and the hole, wherein the insulator is compressed to form a hermetic seal between the insulator and dome and between the insulator and electrode, and wherein the first cap and the housing body are hermetically sealed to each other.

10. The energy storage cell as in claim 9, wherein the energy storage media comprises at least one electrode comprising a carbon bearing material.

11. The energy storage cell as in claim 9, wherein the energy storage media comprises at least one of activated carbon and carbon nanotubes.

12. The energy storage cell as in claim 9, wherein the energy storage media comprises an electrochemical double-layer capacitor.

13. The energy storage cell as in claim 9, wherein at least one of the body and the cap comprise one of aluminum, an alloy of aluminum, aluminum clad onto a least one other material and a passivated material.

14. The energy storage cell as in claim 9, wherein the energy storage material in contained in a hermetically sealed housing comprising the housing body and the first cap, and wherein the hermetically sealed housing in configured to have a leak rate of less than less than $5 \times 10^{-6}$ std cc He/sec.

15. The energy storage cell as in claim 14, wherein the housing comprises at least a second cap, the second cap comprising:

a metallic body comprising a dome with a first shape, the metallic body having a hole therethrough, and a non-metallic insulator with a second shape having at least a portion disposed within the dome, said portion substantially conforming to the first shape to form an interference fit between the portion and an inner surface of the dome, wherein the insulator is made from a compressible material and includes a through way passing through the insulator; and an electrode extending through the through way and the hole of the second cap, wherein the insulator is compressed to form a hermetic seal between the insulator and dome and between the insulator and electrode, and wherein the second cap and the housing body are hermetically sealed to each other.

16. The cap as in claim 1, wherein the hermetic seal between the insulator and dome and the hermetic seal between the insulator and electrode are each configured to have a leak rate of less than $5 \times 10^{-6}$ std cc He/sec.

17. The cap as in claim 1, wherein the metallic body comprises aluminum.

18. The cap as in claim 1, wherein the metallic body consists essentially of aluminum or an aluminum alloy.

19. The cap as in claim 1, wherein the metallic body consists essentially of aluminum.

* * * * *